Patented Oct. 17, 1922.

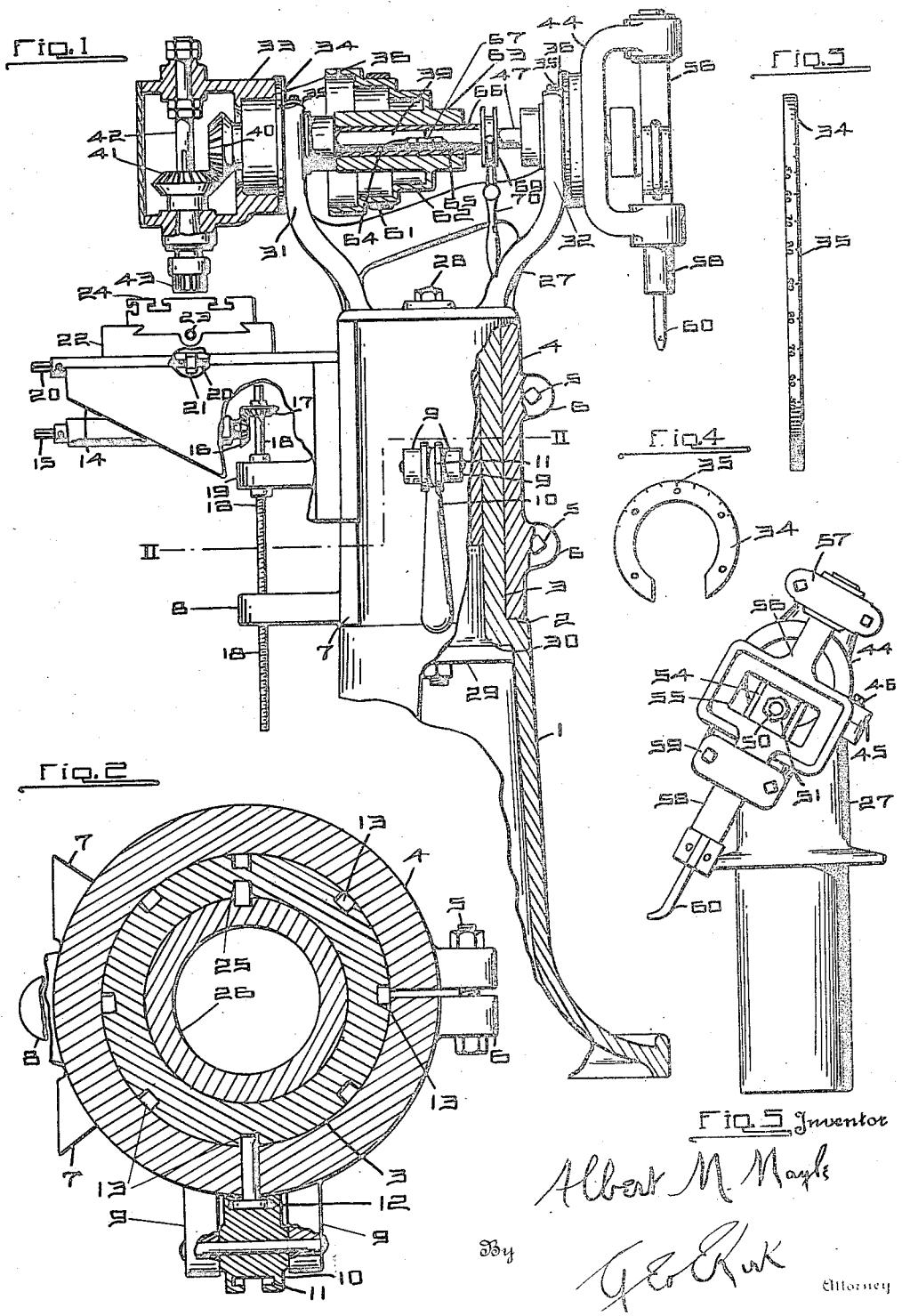

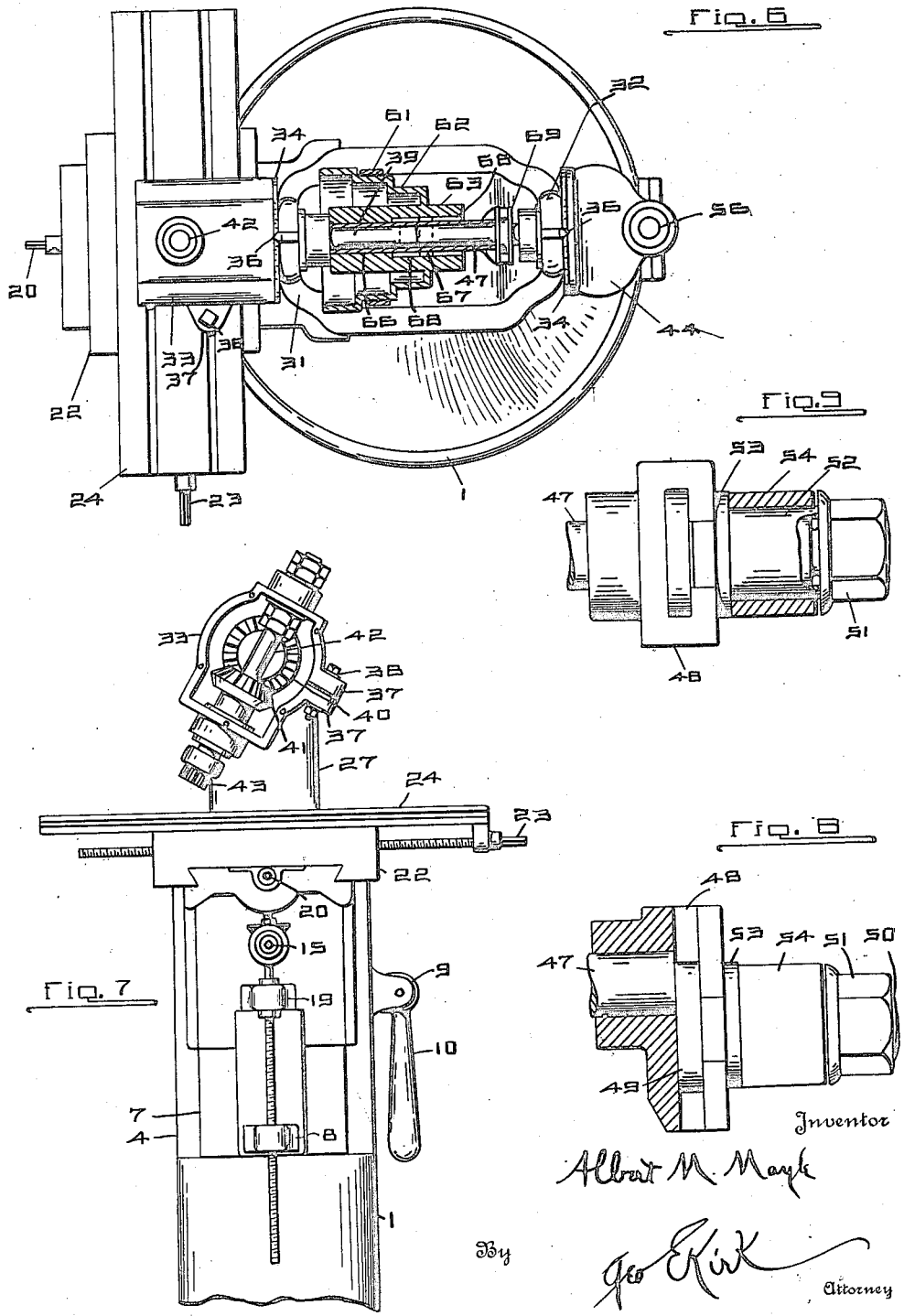

1,432,481

UNITED STATES PATENT OFFICE.

ALBERT M. MAYLE, OF TOLEDO, OHIO.

MULTIPLE-OPERATION TOOL.

Application filed June 25, 1920. Serial No. 391,690.

*To all whom it may concern:*

Be it known that I, ALBERT M. MAYLE, a citizen of the United States of America, residing at Toledo, Lucas County, Ohio, have invented new and useful Multiple-Operation Tools, of which the following is a specification.

This invention relates to machine tools, more especially being designed for carrying out different operations upon an article at a single set up of the article.

This invention has utility in a pedestal swing table power head machine, say in combining a miller and slotter.

Referring to the drawings:

Fig. 1 is a fragmentary side elevation of an embodiment of the invention as a miller and slotter machine tool;

Fig. 2 is a section on an enlarged scale on the line II—II, Fig. 1;

Fig. 3 is a plan view of graduation carrying plate for showing angular adjustments of the carriers.

Fig. 4 is a front view, on a reduced scale, of the plate of Fig. 3;

Fig. 5 is a front view of the slotter carrier;

Fig. 6 is a plan view, partly in section, of the machine tool of Fig. 1;

Fig. 7 is a front view of the miller over the table;

Fig. 8 is a detail view of the eccentric wristpin for effecting reciprocation of the slotter; and Fig. 9 is a plan view of the wristpin of Fig. 8.

The machine tool is shown as comprising a base or pedestal 1, having a shoulder 2, upwardly extending from which is a bearing 3 upon which is mounted a sleeve 4 snugly adjusted thereto against vibration by bolts 5 through ears 6. This sleeve 4 has vertical wedge guides 7 and an arm 8, as well as a pair of ears 9 for vertically swingable handle 10 having eccentric T-slot 11 engaging the head of a bolt 12, positively withdrawn or thrown by the handle 10 out of or into engagement with a recess 13 in the bearing 3, as the sleeve 4 is shifted to be anchored in various angular positions as to the pedestal 1.

Mounted on the guides 7 is table element or knee 14 carrying a table adjusting shaft 15 operable for vertical shifting of the table as to the pedestal 1, for this shaft 15 carries a bevel pinion 16 in mesh with a bevel pinion 17 on shaft 18 fixed against longitudinal movement as to bearing 19 of the table element 14, and having its threaded portion coact with the arm 8 in positively shifting or adjusting the table.

Shaft 20 in the upper portion of the knee or table element 14, is longitudinally fixed, and has its threaded portion coact with a nut 21 in shifting intermediate or second table section 22 in and out as to the pedestal 1. Shaft 23 similarly coacts with upper or third table section 24 in shifting this last table and work holding section transversely of the adjustments of the table section 22.

By key 25, tubuar stem 26 may be held against angular shifting in the pedestal 1, while head 27 fixed with this stem 26, further locks the structure assembled by having a bolt 28 coacting with cross-bar 29 engaging under internal shoulder 30 of the pedestal 1. The head 27 is shown as provided with a pair of aligned bearings 31, 32. A housing 33 is mounted for angular shifting as to the bearing 31, and for ready determination of the angular shifting thereof, this housing carrier a U-shaped plate 34 having degree graduations 35 away from vertical position (Figs. 1, 3, 4,). A fixed pointer 36 coacting with the graduations 35, is mounted on the bearing 31. The housing 33 is split and carries a pair of ears 37 clamped by a bolt 38 in fixing the desired angular position of this housing 33 as to the bearing 31.

In the bearing 31 is a shaft 39 carrying a bevel pinion 40 in the housing 33, which pinion 40 is in mesh with a bevel pinion 41 on rotary tool carrier shaft 42 carried by the angularly adjustable housing 33. A rotary tool, as a milling cutter 43, may be operated by the carrier 42 in dressing work anchored with table section 24.

On the bearing 32 is a housing 44, which is split and provided with a pair of clamping ears 45 set up by a bolt 46 in locking this second housing in the desired angular relation as to the bearing 32. A second U-plate 34 with graduations 35, is anchored to this housing 44 as the other plate 34 is anchored with the housing 33. A fixed pointer 36 is also mounted on the bearing 32 to coact with this gage or graduation plate 34, to permit ready reading or setting of the degree of angular adjustment.

In the bearing 32 is a shaft 47 aligned with the shaft 39. This shaft 47 carries a T-slotted head 48 (Figs. 8, 9) in which may engage flange 49 of wrist pin 50. Nut 51 on the pin 50, may coact with sleeve 52 on the pin 50 and force flange 53 of the sleeve 52 against the head 48 in locking the wristpin 50 in the desired eccentric position as to the driving shaft 47. On this sleeve 52 is disposed a rectangular bearing block 54 (Fig. 5) slidable in transverse slot 55 of a tool carrier member having an extension 56 a guide reciprocable in bearing 57 of the housing 44. Oppositely from this extension 56, the tool carrier has a tool carrying extension 58, slidable in bearing 59 of the housing 44. Fixed in the extension 58 may be a reciprocable cutting tool 60, say for fixing a keyway, or other work upon the article which has undergone milling operation at the housing 33. The throwing of the handle 10, to withdraw the pin 12, allows ready swinging of the table and work away from the housing 33. An intermediate position, not even under the head housing 44 may be taken, say for manual operation, as hand filing, or close inspection. With the original setting of the work, the table may then be shifted to position under the housing 44 for reciprocable cutter treatment. In the getting out of production involving minor diverse operations as herein disclosed, there is a saving in time of forty to sixty per cent.

The driving of the tools may be brought about at various speeds by placing a driving belt 61 on the desired step of step cone pulley 62. This step cone pulley 62 has an extended hub 63 embracing the aligned ends of the shafts 39, 47, which respectively carry transverse notches 64, 65. Between the hub 63 and these shafts 39, 47, is an intermediate sleeve 66 having medially transversely therethrough and extending therebeyond, a key or bar 67 of such proportion that it may be fully in the notch 64, fully in the notch 65, or be between the shafts 39, 47, to engage both notches 64, 65, simultaneously, in the longitudinal shifting of this sleeve 66. The bar 67 in extending beyond the sleeve 66, coacts with spline ways 68 in the hub 63. A grooved collar 69 fast with the sleeve 66 may be engaged by control handle 70 for positioning the bar 67 so that the pulley 62 in driving the bar 67 in engagement with the ways 68, may be wholly in notch 64 to drive milling tool 43; may be wholly in the notch 65 to drive solely the slotting tool 60; or may be partially in both notches 64, 65, to drive both tools, with table and work arranged accordingly.

What is claimed and it is desired to secure by Letters Patent is:

1. A machine tool comprising a tubular pedestal, a power head on the pedestal embodying a flange to rest upon the top of the pedestal and a stem to enter the pedestal, a table provided with a sleeve on the pedestal below the head flange, and means for anchoring the table in different angular positions as to the head and as to the pedestal.

2. A machine tool comprising a tubular pedestal provided with internal and external shoulders, a table provided with a sleeve resting on the external shoulder of the pedestal, a head provided with a flange extending above the sleeve, and head holding means central of the pedestal between the head and pedestal internal shoulder.

3. A machine tool comprising a pedestal, a power head thereon provided with a single pair of aligned bearings, a tool carrier for each bearing, one of said carriers being provided with a guide transversely of its bearing for a reciprocating tool, said carriers each comprising a yoke for embracing a bearing, a split ring bearing embracing clamp for holding the yoke in different angular positions as to the pedestal for directing the tool to the work, rotary means through said bearings, and an actuator for the means coaxial with the bearings and disposed between the bearings and sustained thereby.

4. A machine tool comprising a tubular pedestal provided with internal and external shoulders integral therewith, a table provided with a sleeve resting on the external shoulder of the pedestal, a head provided with a flange extending above the sleeve and a guide stem extending into the tubular pedestal, and head holding means central of the pedestal between the head and pedestal internal shoulder.

5. A machine tool comprising a head, a pair of carriers mounted on the head, driving means for the carriers including a sleeve, a shaft for each carrier embraced as to a portion thereof by said sleeve, and means for connecting either or both shafts to the sleeve.

6. A machine tool comprising a head, a pair of carriers mounted on the head, aligned shafts for the carriers, a driving sleeve for said shafts carrying a key, said shafts being terminally notched at their adjacent ends, and means for shifting the key as to said notches.

7. A machine tool comprising a pedestal, a table therefor, a head mounted on the pedestal above the table, a pair of aligned bearings carried by the head, one having a horizontal cylindrical portion, a rotating shaft concentrically through said cylindrical portion and the other bearing, an actuator for the shaft coaxial with the shaft bearing and cylindrical portion disposed between the bearings and sustained thereby, a tool carrier yoke on the cylindrical portion provided with means extending diametrically of the shaft for mounting a tool to be actuated, and a split ring bearing embracing clamp for anchoring the yoke on said cylindrical portion for positioning the tool mounting means in different angular positions as to the pedestal in directing the tool to the work.

8. A machine tool comprising a pedestal, a power head thereon provided with a pair of aligned bearings, a tool carrier for each bearing, a driving shaft between the carriers and through the bearings, a driving pulley for the shaft on the shaft between the bearings, a table for mounting work below the carriers, and split ring bearing embracing means for adjusting the carriers for different angles of tool operations as to the work, said head and carriers being provided with indication means coacting therebetween as to the positions for angular adjustments.

In witness whereof I affix my signature.

ALBERT M. MAYLE.